(12) United States Patent
Skene et al.

(10) Patent No.: US 6,783,784 B2
(45) Date of Patent: Aug. 31, 2004

(54) METHOD AND SYSTEM FOR FORMING A COOKED PRODUCT USING ULTRASONIC ENERGY

(75) Inventors: Gary Skene, Meadowvale (CA); John M. Martin, Blairstown, NJ (US); Dennis Delaney, Dublin, OH (US); Laura Paluch, Yorda Linda, CA (US); Roberto A. Capodieci, Glen Ellyn, IL (US)

(73) Assignee: Mars Incorporated, McLean, VA (US)

( * ) Notice: Subject to any disclaimer, the term of this patent is extended or adjusted under 35 U.S.C. 154(b) by 25 days.

(21) Appl. No.: 10/137,230

(22) Filed: May 2, 2002

(65) Prior Publication Data

US 2003/0207001 A1 Nov. 6, 2003

(51) Int. Cl.⁷ .............................. A23L 1/31; A23P 1/00
(52) U.S. Cl. .................... 426/238; 99/426; 99/441; 99/451; 426/513; 426/516; 426/523
(58) Field of Search ....................... 426/512, 513, 426/516, 520, 523, 238; 99/426, 441, 451

(56) References Cited

U.S. PATENT DOCUMENTS

| | | | |
|---|---|---|---|
| 4,225,630 A | 9/1980 | Pitchon | |
| 4,258,066 A | 3/1981 | Bernard | |
| 4,675,194 A | 6/1987 | Gaffney | |
| 5,593,713 A | * 1/1997 | De La Luz-Martinez et al. ................ | 426/238 |
| 6,042,466 A | 3/2000 | Matthews et al. | |
| 6,146,674 A | 11/2000 | Manna et al. | |
| 6,326,039 B1 | 12/2001 | Schiffmann et al. | |

* cited by examiner

Primary Examiner—George C. Yeung
(74) Attorney, Agent, or Firm—Fulbright & Jaworski LLP

(57) ABSTRACT

A system and method for forming a cooked, shaped product (e.g., an animal food) is provided. A flowable substrate is introduced into one or more shaping chambers in a fixture configured to both shape and cook the substrate. An ultrasonic energy source in communication with the fixture vibrates the walls of the one of more shaping chambers to cook the substrate in a desired manner. The fixture also may be configured to produce a shaped, hollow product and a multi-layer product.

35 Claims, 6 Drawing Sheets

METHOD AND SYSTEM FOR FORMING A COOKED PRODUCT USING ULTRASONIC ENERGY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The present invention relates generally to manufacturing processes and systems for producing shaped substances. More particularly, the present invention relates to a manufacturing method and system that forms a shaped, cooked product using ultrasonic energy.

The food industry typically is geared for the mass production of various different types of food products intended for consumption by animals, including pets and humans. A mass production assembly line often requires physically large pieces of equipment to handle the volume. Typically, the manufacturing process involves many steps, all of which must be performed at different stations. For example, a typical process for producing a food product (e.g., animal food) may include mixing the ingredients, emulsifying the mixture, shaping or extruding the emulsion into "ropes," cooking the ropes in a steam tunnel, cutting the cooked product, and storing the cooked product in accumulators until needed for later processing. The process further may include mixing the cooked product with other ingredients (e.g., a gravy), dispensing the mixed product into pouches, sealing the pouches, sterilizing the pouches, and commercial packaging of the final product. It can be seen from this example that numerous stations and large pieces of equipment are needed, all of which may require a large manufacturing facility. Thus, a mass production assembly line often is capital intensive.

To attain the most efficient use of production equipment, a particular assembly line often may be used to manufacture different variations of a food product. For example, the same assembly line might be used to produce a food product made of either chicken or beef. To prevent contamination, the assembly line must be broken down and thoroughly cleaned and sterilized after producing the first variety before the line can be used to produce the second variety of the food product. Stopping and cleaning the assembly line is costly, both in terms of labor and time.

Such cost concerns dictate that large runs of a particular variety of a food product should be completed before stopping and preparing the assembly line for another variety of the food product. However, large runs of a food product mean that mass quantities of the product must be stored until needed. Oftentimes, spoilage and waste may result from inventorying the food product, thus further affecting the cost associated with a mass production facility.

For some food products, it may be desirable to produce relatively small batches at a given time to minimize spoilage and waste. However, it may be cost-prohibitive to use a mass production assembly line to manufacture low volumes of the product due to the expenses associated with stopping and preparing the line for production of a new product. Thus, it would be desirable to provide an assembly line that was cost effective for small batch production of a particular food product or variety of a food product. Using smaller equipment and reducing the number of stations through which the food product must pass could realize such cost effectiveness. For example, it would be advantageous to provide a station at which multiple processing steps could occur. In the case of an extruded or shaped food product, it would be desirable if the food product easily could be shaped and cooked in the same fixture.

In a conventional shaping fixture, a flowable substrate, such as an edible emulsion, is fed or pumped into a nozzle block having a plurality of ports. The continuous feeding of the emulsion into the nozzle block forces the emulsion through the block and out the ports, thus shaping the emulsion into ropes that are fed onto a large belt in the assembly line. The belt conveys the resulting ropes through a long steam tunnel in which they are cooked until reaching a temperature greater than 85° C. It would be desirable if the shaping and cooking of the emulsion could occur in a single fixture, thus eliminating the need for a lengthy conveyor belt and steam tunnel.

It has become increasingly popular to produce food products having a variety of shapes and even more popular to provide multiple shapes in one package. Currently, the conventional method for providing multiple shapes is to complete an entire run for each shape. Multiple runs lead to large inventories of the shaped product. Moreover, this method also leads to delays in further processing and final packaging because a run for each individual shape first must be completed. Further, in accordance with many known techniques, the edible substrate is first cooked and then shaped using a shaping die, resulting in significant quantities of wasted material. Accordingly, it would be desirable to provide a fixture that could simultaneously cook and shape an edible substrate with minimal waste and that could simultaneously provide different shapes such that processing immediately could proceed to the next assembly step and final packaging.

In addition to shaped food pieces, hollow food pieces that may be filled with other food substances and food pieces having multiple layers of different ingredients are in demand. Currently, there is no known method of shaping and cooking either a hollow food piece or multi-layer food piece in a single fixture. Accordingly, it would be desirable to provide such a fixture.

BRIEF SUMMARY OF THE INVENTION

The present invention is directed toward a system and method of continuously forming a shaped, cooked product using ultrasonic energy. In accordance with one aspect of the invention, a manufacturing process for producing a cooked, shaped product from a first flowable substrate is provided. The process comprises placing the substrate between a first shaped surface and a second shaped surface, the second shaped surface substantially surrounding and spaced radially outward of the first shaped surface. The process further comprises vibrating the first and second shaped surfaces to impart sufficient energy to the flowable substrate to harden at least one of an exterior surface and an interior surface of the flowable substrate.

In accordance with another aspect of the invention, a manufacturing process for making a cooked, shaped product is provided. The process comprises feeding a first flowable substrate through a shaping chamber that is defined by a first surface and a second surface. The second surface substantially surrounds and is spaced radially outward of the first surface. While the flowable substrate passes through the shaping chamber, the first and second shaped surfaces are vibrated to impart sufficient energy to the flowable substrate such that it retains its shape after exiting the shaping chamber.

In accordance with a further aspect of the invention, a manufacturing process for making a cooked, shaped product from a flowable substrate is provided. The process comprising shaping the flowable substrate by feeding the substrate through a shaping fixture comprising a plurality of chambers. Each of the chambers is defined by a wall having a shaped surface. Each of the shaped surfaces has a unique shape. While the substrate is fed through the chambers, the shaped surfaces are vibrated to impart sufficient energy to cook the flowable substrate. When the flowable substrate exits the chambers, it is cut to form a mixture of uniquely shaped chunks.

In accordance with yet another aspect of the invention, a manufacturing process for making a shaped cooked product comprises continuously feeding a flowable substrate through a shaping fixture that includes at least one cavity defined by a wall having a shaped surface. A sufficient volume of the flowable substrate is introduced into the cavity such that the substrate contacts substantially all of the shaped surface. The shaped surface is vibrated to impart cooking energy to the volume of the substrate introduced into the cavity. The flow rate of the substrate through the cavity is controlled such that sufficient cooking energy is imparted to thoroughly cook the entire volume of the flowable substrate.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The present invention provides a system and method of forming cooked, shaped products from a flowable substrate. The shaped product is made in a process in which a flowable substrate is shaped and cooked in a single fixture. The shaped, cooked product then can be cut into chunks. In some embodiments, shaping of the flowable substrate results in the production of a hollow product that then can be cut into pieces and filled with other substances if desired. Alternatively, the hollow portion may be filled while in the shaping and cooking fixture. As a further alternative, the shaping/cooking fixture can be configured to produce a layered cooked product. For example, the resulting product may have a core made from a first type of substrate, and one or more layers surrounding the core made of one or more other types of substrates.

Cooking and shaping the product in a single fixture allows for the use of smaller manufacturing equipment and fewer assembly line stations. A fixture which is configured to simultaneously produce different shapes provides the beneficial capability of passing the shaped cooked product immediately to further processing and final packaging. This feature is particularly advantageous for the production of a final product which includes a mixture of differently shaped, cooked pieces. In particular, each individual shape need not be inventoried until a sufficient amount of differently shaped products are available for placement in a single package.

The following detailed description discusses the production of a food product intended for animal (e.g., domestic or human) consumption. It should be understood, however, that the invention is applicable to the cooking and shaping of any product that is made from a flowable substrate, regardless of whether suited for animal consumption.

Figure 1:
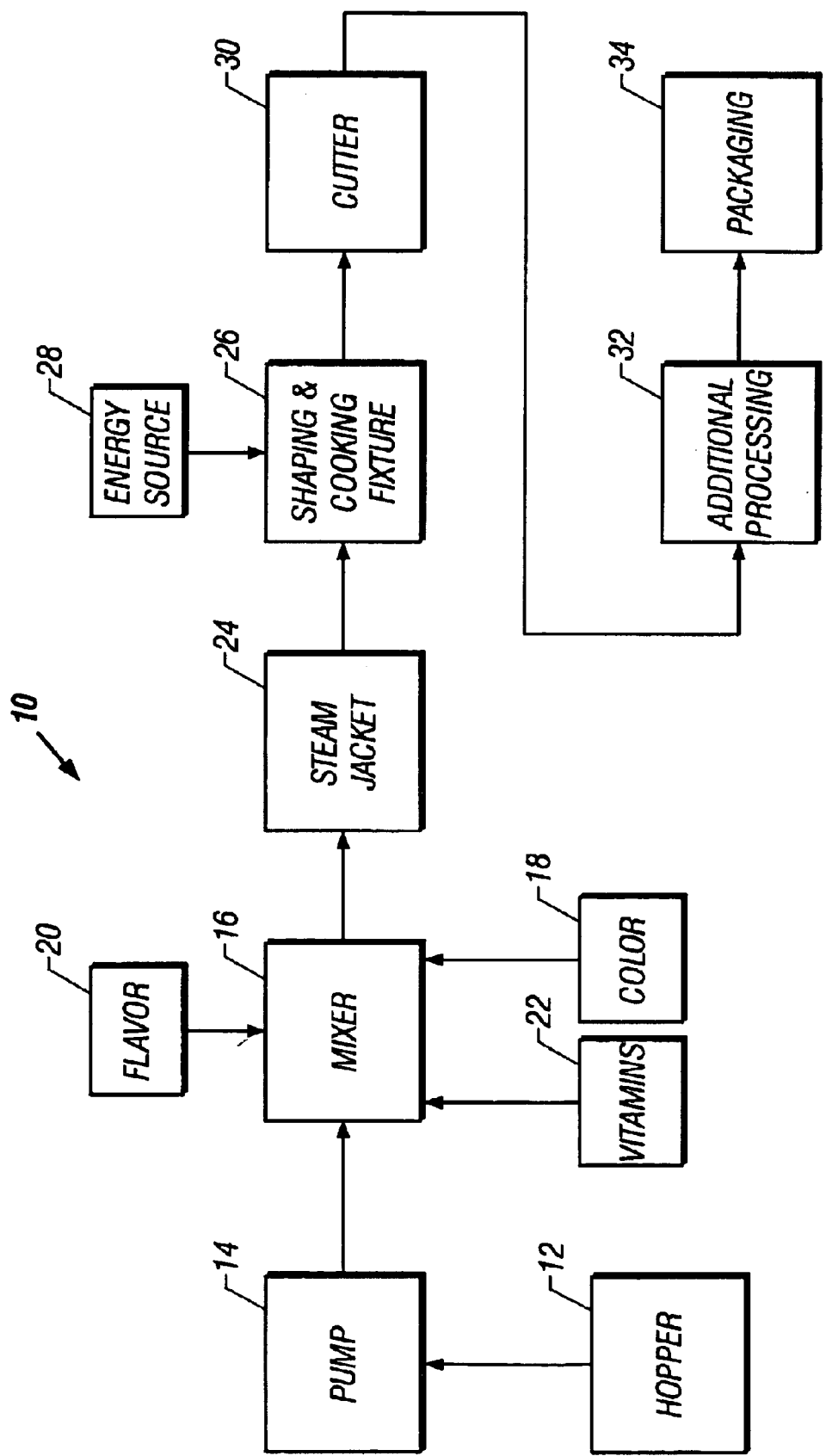
FIG. 1 is a block diagram of a manufacturing system for producing a cooked, shaped product in accordance with the invention.

Turning now to the drawings and in particular to FIG. 1, a block diagram illustrating an exemplary manufacturing system 10 for producing a cooked, shaped product that is cut into a plurality of chunks is illustrated. A protein-based substance, such as ground beef or chicken, is placed in a hopper 12. A pump 14 pumps the protein-based substance into a mixer 16 for mixing with a variety of other ingredients. For example, it may be desirable to mix the protein-based substance with one or more of a coloring agent 18, a flavoring agent 20, and a vitamin mixture 22. Typically, the ingredients are combined in the mixer 16 for 1 to 10 minutes, or any other time period to adequately distribute the ingredients throughout the mixture. The flowable substrate that results from the mixing process then may be transported through a steam jacket 24 to heat the substrate. Pre-heating the flowable substrate prior to entering a shaping/cooking fixture 26 can reduce the length of time the substrate must remain in the fixture to ensure that it is thoroughly cooked. Steam also may be injected directly into the substrate to introduce moisture and enhance flowability, thus facilitating introduction of the substrate into the shaping/cooking fixture 26. Steam heating, steam injection, or both may be included or omitted in the manufacturing process depending on the composition of the substrate.

The shaping/cooking fixture 26 can have one or more shaping chambers to shape the flowable substrate as it is introduced therein. Each shaping chamber is defined by a wall having a shaped surface. A sufficient volume of substrate is introduced into each chamber such that it comes into contact with and is contoured by the shaped surface of the wall. The surface may be contoured to provide any of a variety of shapes. For example, each chamber may be generally tubular with a circular cross section, a star-shaped cross section, a crescent-shaped cross section, a dog-bone-shaped cross section, etc.

In accordance with the invention, the flowable substrate is both shaped and cooked in the fixture 26. In one embodiment, the flow rate of the substrate through the fixture 26 is controlled to ensure that the substrate is cooked as desired while in the shaping chamber. The amount of time needed to cook the substrate will depend on a variety of factors, such as the dimensions of the chamber, the composition of the flowable substrate, the type of energy source 28 used to cook the substrate, and the desired cooking result. For example, thorough cooking of the entire volume of a protein-based substrate has been attained in approximately 10 seconds in a continuous feed process using a titanium shaping/cooking fixture 26 having a tubular shaping chamber approximately one-half inch in diameter and 4 inches in length. In this configuration, the cooking energy was provided by a 20 KHz ultrasonic energy source 28 having a 2000–3000 W output in communication with the fixture 26.

In addition to providing energy to cook the substrate, the vibration of the surface of the wall defining the shaping chamber prevents adherence of the substrate. This "non-stick" feature may be enhanced if the wall surface has "non-stick" properties or a "non-stick" coating has been applied thereto. However, in processes in which the substrate is continuously fed through the shaping/cooking fixture 26, such "non-stick" properties may result in overly rapid passage of the substrate through the shaping chamber. Thus, in some embodiments, it may be desirable to provide a back pressure that opposes the flow of the substrate through the chamber to ensure that the substrate is in the chamber for a sufficient time to attain the desired cooked state.

Figure 8:
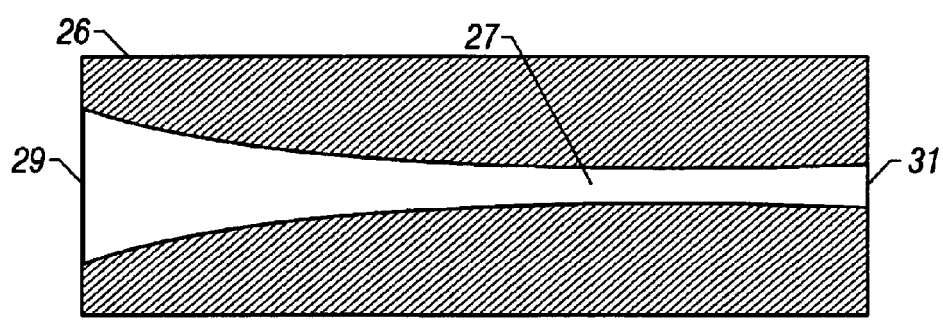
FIG. 8 is a cross-sectional view of an exemplary embodiment of a cooking/shaping fixture having a tapered shaping chamber.

Provision of such a back pressure may be implemented in many different manners, including air pressure, hydraulic pressure, and mechanical limitations which can restrict the flow of the substrate. In some embodiments, the back pressure may be removed after the leading portion of the substrate has been cooked. That is, expansion of the leading portion as a result of cooking will provide a resistance in the shaping chamber against the flow of the following portions of the substrate. In other embodiments, it may be desirable to maintain the back pressure, but at a reduced level, after the leading portion has been cooked. In another exemplary embodiment, the shaping chamber itself may be configured to create a back pressure. For example, at least a portion of the chamber may be tapered as shown in the cross-sectional view illustrated in FIG. 8 in which the fixture 26 includes a shaping chamber 27 having an inlet 29 for receiving the flowable substrate and an outlet 31 through which the cooked product is expelled.

In one exemplary embodiment, the substrate is passed in a continuous manner through the fixture 26, and the energy source 28 applies the cooking energy in a continuous manner. In other embodiments, the manufacturing system 10 may be configured such that the substrate fills a chamber, and then remains at rest until it is cooked. In such an embodiment, the energy source 28 may be configured to apply the cooking energy in a discontinuous manner. For example, the energy source 28 may be activated only while the substrate is at rest in the chamber. In such embodiments, the flow of the substrate through the chamber can be controlled merely by introducing the substrate into the fixture 26 in a discontinuous manner. Thus, in such embodiments, provision of a back pressure may not be needed to ensure that the substrate remains in the chamber for a sufficient period of time.

In one embodiment of the invention, the energy source 28 is a vibrational energy source (e.g., an ultrasonic source) which is configured to communicate with the fixture 26 to vibrate the shaped surface of the chamber walls such that sufficient energy is transferred to the flowable substrate to alter its physical and/or chemical state in a desired manner. For purposes of this disclosure, a physical and/or chemical change of state will be referred to as "cooked." For example, it may be desired to provide sufficient energy to "cook" the ingredients of the flowable substrate such that all or a portion of the ingredients no longer are in a raw state. Alternatively, it may be desired to provide sufficient energy to cook the substrate such that the surface of the substrate that is in contact with the chamber wall becomes hardened. Still further, it may be desired to provide adequate energy to cook the substrate such that it is sufficiently stiffened and can retain its shape after exiting the shaping chamber. In some embodiments, a combination of state changes may be desired when cooking the substrate. For example, it may be desired to provide sufficient energy such that the ingredients are removed from the raw state and the exterior surface of the substrate is made into a hard shell.

In other embodiments, the energy source 28 may be a different type of energy source or may include a plurality of different types of energy sources. For example, the energy source 28 may include both a thermal energy source and an ultrasonic energy source. Regardless of the type of energy source 28, a cooked, shaped product exits the fixture 26.

Upon exiting the fixture 26, a cutting device 30, such as a rotary blade, cuts the cooked shaped product into a plurality of pieces or chunks. For example, in a process for making animal food, the chunks are sized for compatibility with the animal that will consume the food product.

The chunks then may be subjected to further processing 32, such as placement in a gravy, addition of nutrients or coloring, additional cooking, etc. Finally, the chunks may be packaged for commercial use by a packaging device 34.

Figure 2:
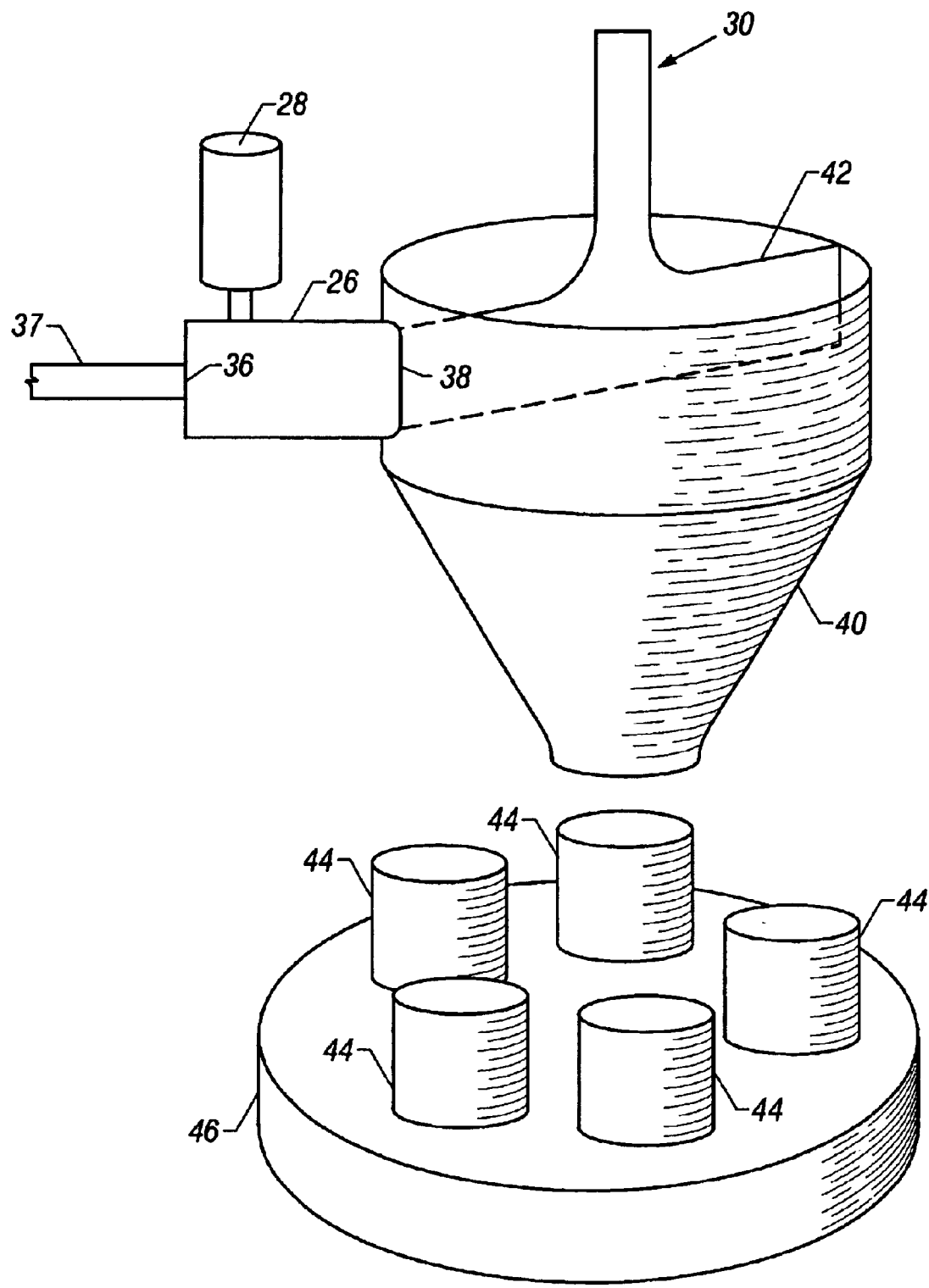
FIG. 2 illustrates an exemplary embodiment of a cooking/shaping fixture, an energy source, and a cutting device in accordance with the invention.

Referring now to FIG. 2, an exemplary embodiment of a shaping/cooking fixture 26, energy source 28, and cutting device 30 are illustrated. The fixture 26 includes an inlet port 36 in communication with a feed tube 37 through which the flowable substrate is introduced into the shaping chamber of the fixture 26. The energy source 28 is an ultrasonic energy source in communication with the fixture 26 in a manner sufficient to vibrate the shaped surface of the shaping chamber within the fixture 26. The fixture 26 further includes an outlet port 38 in communication with a dispenser 40. As the cooked shaped substance exits the fixture 26 via the outlet port 38, a rotating blade 42 of the cutting device 30 cuts the cooked shaped substance into a plurality of chunks. The chunks fall through the dispenser 40 into a plurality of bins 44 disposed on a turntable 46. The bins 44 may be pre-filled with a liquid substance, such as gravy, flavoring, nutrients, etc. Alternatively, the bins 44 may be filled with the liquid substance after the chunks are dispensed therein.

Figure 3:
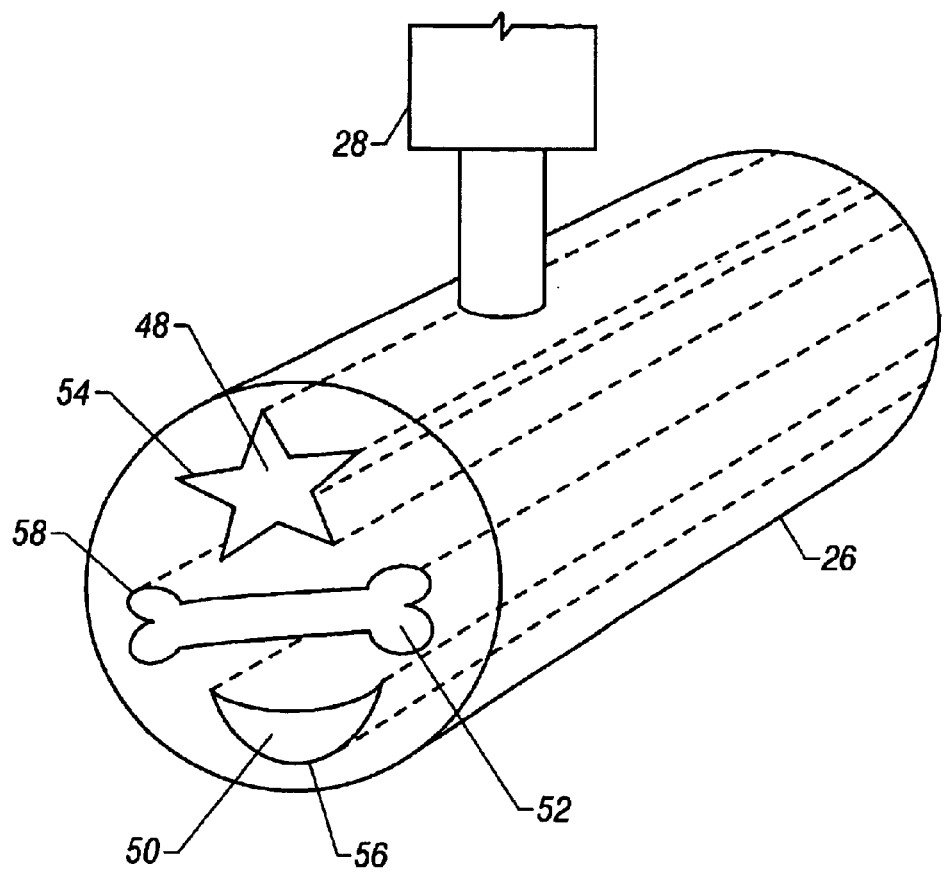
FIG. 3 illustrates an exemplary embodiment of a cooking/shaping fixture having multiple shaped chambers.

Turning now to FIG. 3, an exemplary embodiment of a shaping/cooking fixture 26 having a plurality of shaping chambers 48, 50, and 52 is illustrated. Each of the shaping chambers 48, 50, and 52 extend the length of the fixture 26 and are defined by a respective wall 54, 56, and 58 having a unique shaped surface (e.g., a star, a crescent, and a dog bone). The fixture 26 also may include a plurality of inlets (not shown), each inlet being in communication with a respective chamber. In the embodiment illustrated in FIG. 3, three chambers are shown, each of which has a different shape. In alternative embodiments, fewer or additional chambers may be included in the fixture 26. The chambers each may be uniquely shaped or may have the same shape and the same or different sizes.

Figure 4:
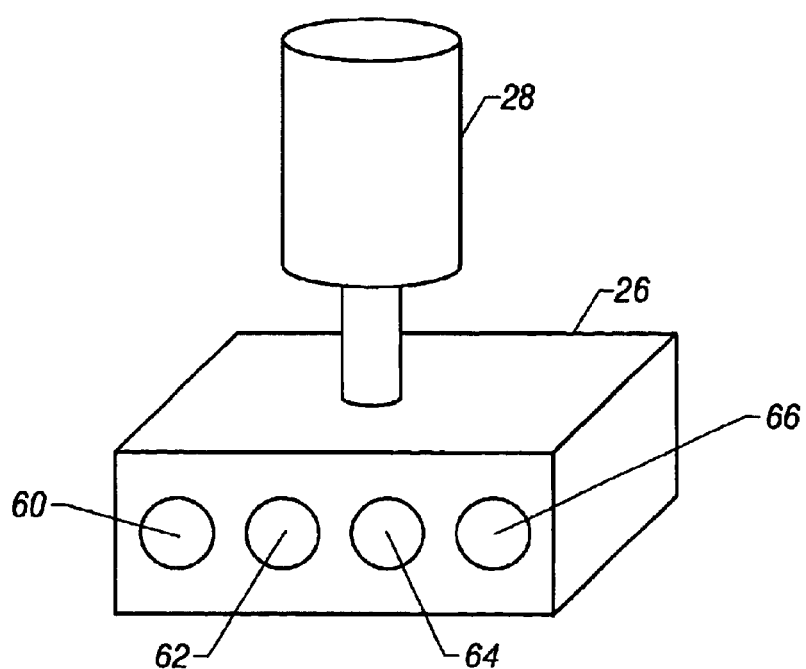
FIG. 4 illustrates another exemplary embodiment of a cooking/shaping fixture having multiple shaped chambers.

For example, FIG. 4 illustrates another embodiment of a power source 28 in communication with a fixture 26 having a plurality of chambers 60, 62, 62, and 66. Each of the chambers 60, 62, 64, and 66 are tubular in shape with a circular cross section.

The embodiments described thus far have been directed to the formation of solid chunks of an edible product made from a single flowable substrate. In such embodiments, it often is desirable to thoroughly cook the entire volume of the substrate within the chamber. Such thorough cooking may be beneficial because it can significantly increase the shelf life of the cooked product before incipient spoilage occurs. For example, an increase from a shelf life of a few hours to a shelf life of several days may be attained.

Figure 9:
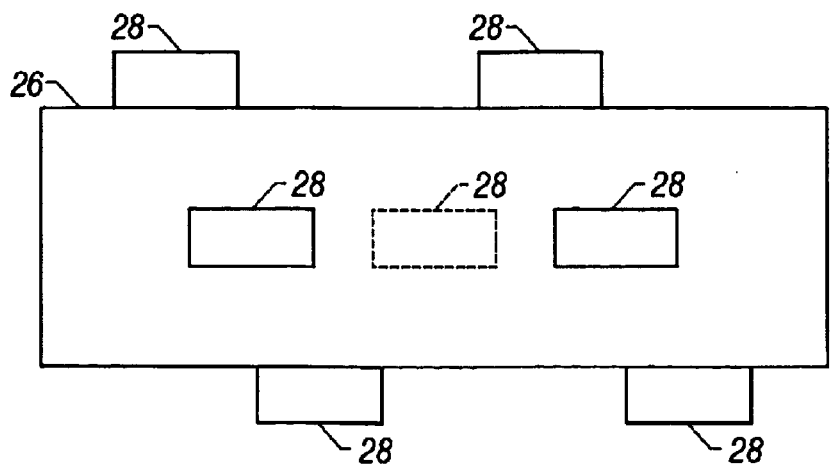
FIG. 9 is a side view of an exemplary embodiment of a cooking/shaping fixture having multiple energy sources in communication therewith.

Placement of the energy source 28 with respect to the shaping and cooking fixture 26 can affect the cooking result. For example, to ensure even cooking of the entire volume of the substrate within the cavity, it may be desirable to arrange several ultrasonic energy sources 28 along the length or around the perimeter of the fixture 26 as shown in FIG. 9. Alternatively, the shaping/cooking fixture 26 may be configured such that the amount of energy imparted to the substrate in the chamber is magnified. This may be accomplished, for example, with a fixture 90 configured as shown in FIGS. 10 and 11.

Figure 10:
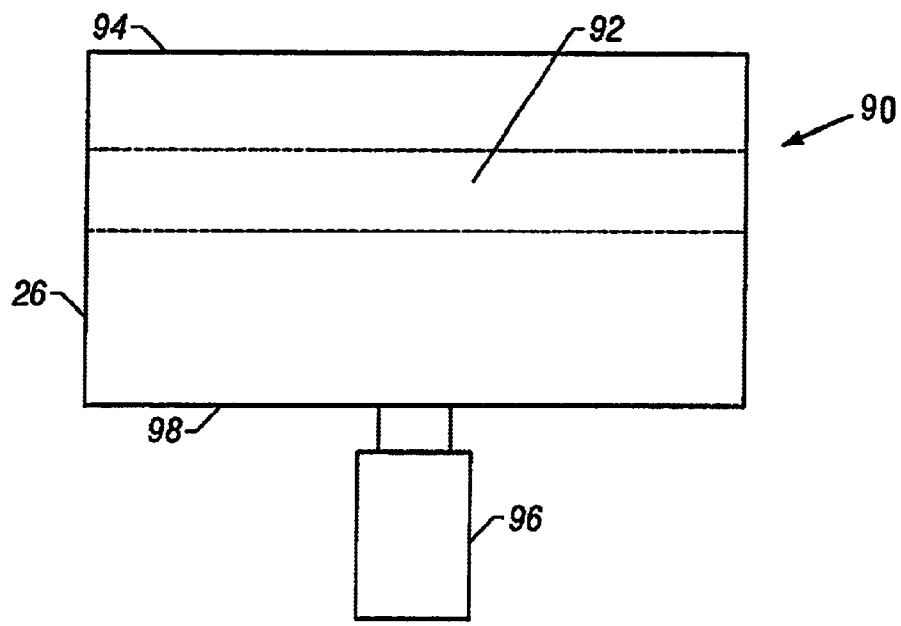
FIG. 10 is a side view of an exemplary embodiment of a cooking/shaping fixture.
Figure 11:
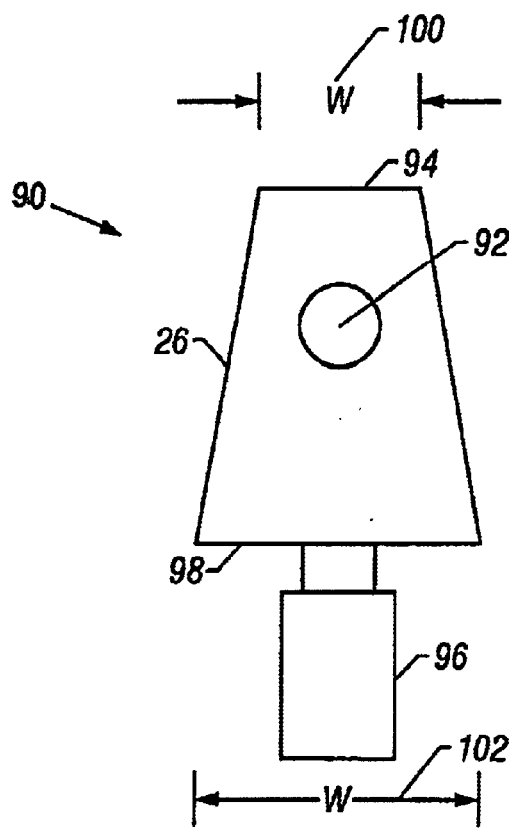
FIG. 11 is an end view of the cooking/shaping fixture of FIG. 10.

Referring to FIGS. 10 and 11, the fixture 90 generally is configured as a block with a tubular chamber 92 formed through the length towards a top portion 94 of the block. The fixture 90 is further configured to communicate with an ultrasonic transducer 96 which couples with the fixture 90 at a bottom portion 98 of the block. Amplification of the ultrasonic energy at the top portion 94 results because the fixture has less material at the top portion than at the bottom portion at which the ultrasonic energy is generated. For example, in one exemplary fixture, the width 100 of the fixture 90 at the top portion 94 is approximately 1 inch, while the width 102 of the fixture 90 at the bottom portion 98 is approximately 2 inches, for a ratio of 2:1. Useful amplifications may be attained with ratios as low as approximately 1.5:1 to as high as approximately 6:1. Ratios between approximately 2:1 and 4:1 are preferred.

The fixture dimensions also are dependent arc the type of energy source used. For an ultrasonic energy source, the height 104 of the fixture 90 generally is a multiple of the wavelength of the ultrasonic frequency, as would be known by one of skill in the art. In typical applications, 20 KHz–40 KHz ultrasonic sources with a power supply providing an output of 2000–3000 W may be used.

In yet other embodiments, multiple single cavity fixtures 26 or 90 may be used in conjunction to produce multiple shaped, cooked products. Each fixture 26 or 90 may have its own energy source 28. Such a configuration may be particularly useful to simultaneously produce multiple products, each of which may be made of a different type of substrate and/or have a unique shape.

In still other embodiments of the invention, the fixture 26 can be configured to form a hollow product that may be cut into chunks or a multi-layered product, each layer of which may be made from a different type or variety of flowable substrate. For example referring to FIG. 5, it illustrates an exemplary embodiment of a fixture 26 having a multi-walled shaping chamber. In the embodiment shown, the chamber generally is configured as a first sub-chamber 68 surrounded by a second sub-chamber 70 that is disposed radially outward of the first sub-chamber 68. The first sub-chamber 68 is defined by a wall 72 having a shaped surface 74. The second sub-chamber 70 is defined by a shaped surface 76 of the wall 72 and a shaped surface 78 of a wall 80. The shaped surface 76 generally surrounds and is spaced radially outward of the shaped surface 74. The wall 72 is supported within the fixture 26 by a plurality of webs 82 and 84.

The fixture 26 further is configured such that when the power source 28 (not shown in FIG. 5) is in active communication therewith, the shaped surfaces 74, 76, and 78 each are vibrated in a manner sufficient to cause the desired physical and/or chemical change to the flowable substrate therein. For example, the fixture 26 may be used to create hollow chunks from a particular flowable substrate. To make such a product, the flowable substrate is introduced into the sub-chamber 70 such that it is in contact with shaped surfaces 76 and 78. The shaped surfaces 76 and 78 can be vibrated in such a manner such that a hard shell forms on the exterior surface of the substrate while the interior surface of the substrate maintains a relatively softer state. Alternatively, the fixture 26 may be vibrated such that the interior surface of the substrate becomes hard relative to the exterior surface of the substrate. Still further, the fixture 26 may be vibrated such that the substrate attains a uniform stiffness and the ingredients are no longer in a raw state. In any event, when the cooked, shaped substrate is expelled from the chamber, it is capable of retaining its hollow shape.

The fixture 26 also may be used to form a multi-layer product. For example, a first portion of flowable substrate may be introduced into the sub-chamber 68 from the direction indicated by the arrow 81. Similarly, a second portion of flowable substrate may be introduced into the sub-chamber 70 via inlets 83, either concurrently with the first portion of substrate or at a different time. The first and second portions of substrate may be the same edible material or may be different types of edible materials. The fixture 26 may be vibrated such that the various layers of the product attain the desired change in physical and/or chemical state.

Figure 5:
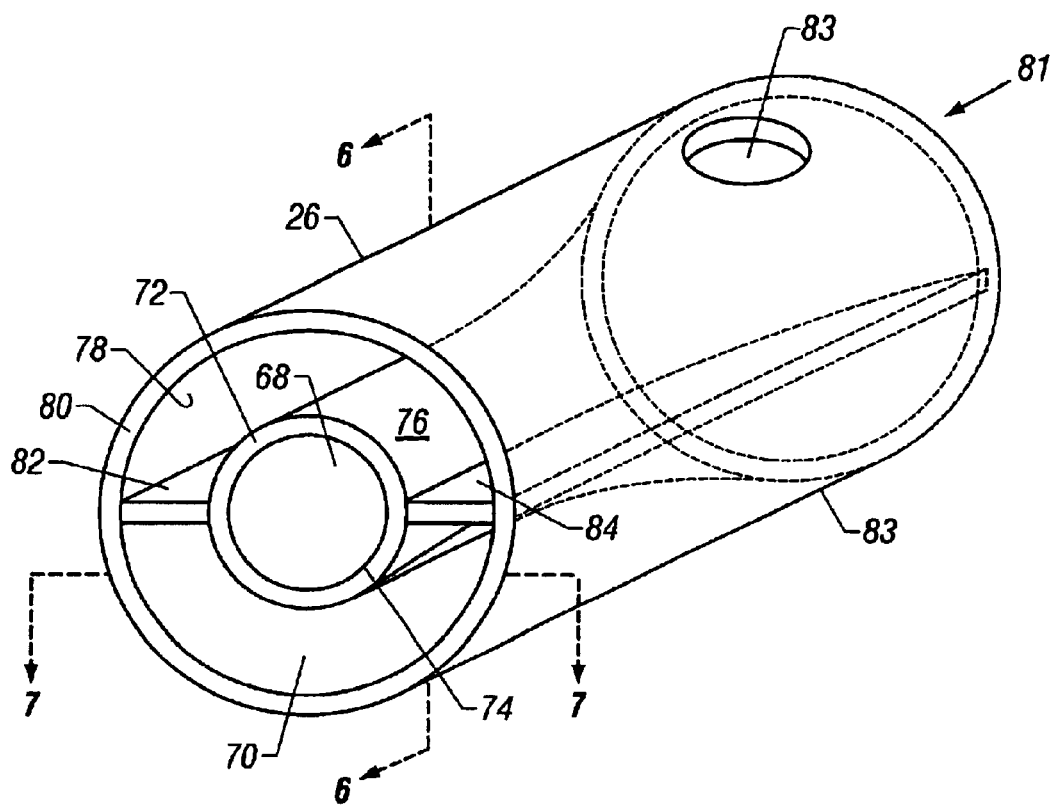
FIG. 5 illustrates an exemplary embodiment of a cooking/shaping fixture for forming a hollow, cooked product in accordance with the invention.
Figure 6:
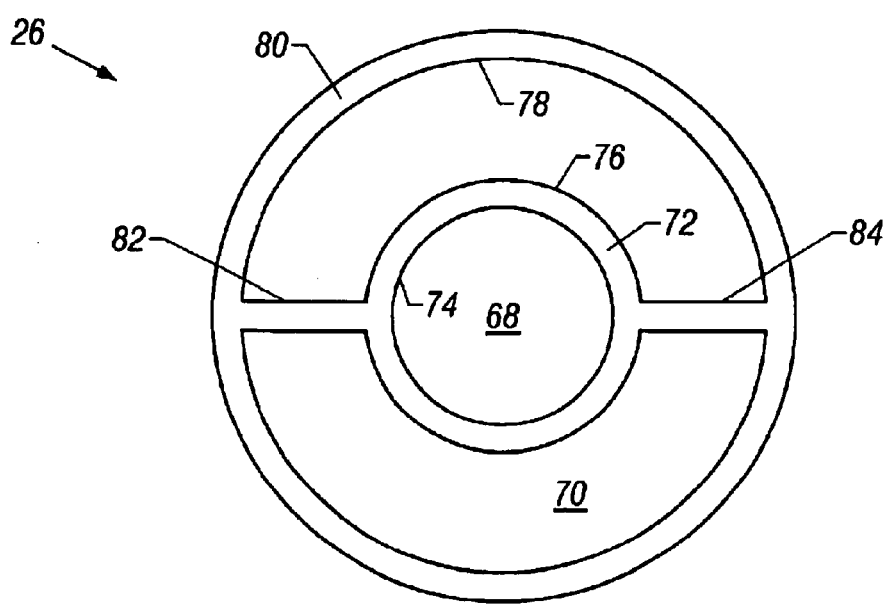
FIG. 6 is a cross-sectional view of the cooking/shaping fixture of FIG. 5, taken generally along the line 6—6 of FIG. 5.

FIG. 6 illustrates a cross-section of the fixture 26 taken generally along the line 6—6 in FIG. 5. Although the multi-walled chamber has been shown as generally circular in cross-section, it should be understood that any of a variety of cross-sectional shapes are contemplated, such as a star, a crescent, a dog bone, etc.

Figure 7:
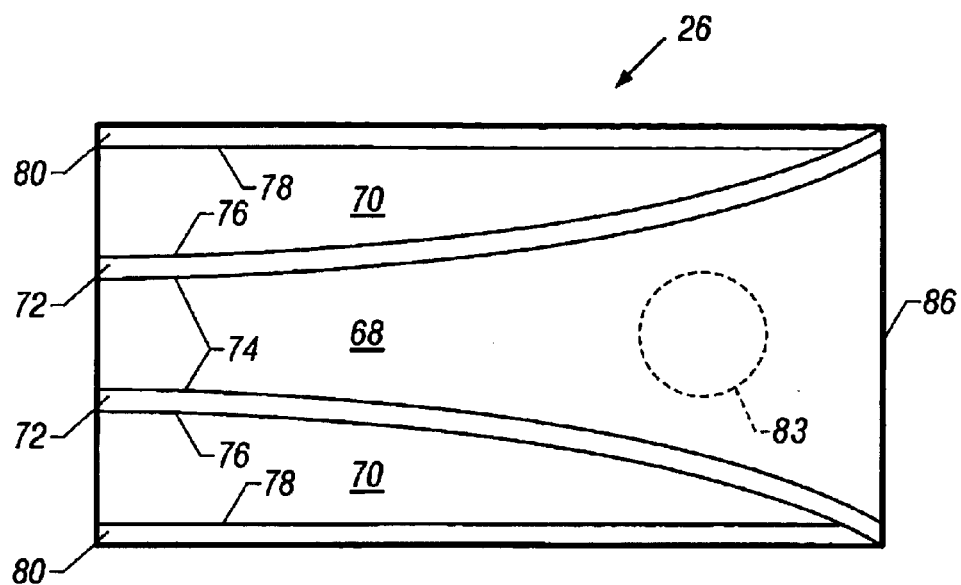
FIG. 7 is a cross-sectional view of the cooking/shaping fixture of FIG. 5, taken generally along the line 7—7 of FIG. 5.

FIG. 7 illustrates a cross-sectional view of the fixture 26 taken generally along the line 7—7 in FIG. 5. This cross-sectional view shows an exemplary embodiment that enables the introduction of different types of flowable substrates into each of the sub-chambers 68 and 70. For example, a first type of flowable substrate may be introduced into the sub-chamber 70 through inlet 83, and a second type of substrate may be introduced into the sub-chamber 68 through the inlet 86.

The foregoing description has been directed to a fixture having a sub-chamber 68 that is generally surrounded by the sub-chamber 70. It should be understood, however, that other arrangements of the sub-chambers 68 and 70 are contemplated. For example, the fixture 26 may include two sub-chambers that are arranged side-by-side to form a multi-layer product. Such a multi-layer product may be made from two different types of substrates, each of which is fed into one of the sub-chambers. Alternatively, the multi-layer product may include a single type of substrate fed into both sub-chambers. In such an embodiment, different amounts of energy may be applied to the respective surfaces of the sub-chambers such that the resultant product has portions of different textures or consistencies. As another example, the fixture 26 may include a sub-chamber that is sandwiched between two other sub-chambers to form a multilayer product. Again, the product may be made from a single type of substrate or different types of substrates and/or each layer may have different textures or consistencies. Other such arrangements would readily occur to those of ordinary skill in the art.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A manufacturing process for producing a shaped, cooked product from a first flowable substrate, comprising:
   placing the first flowable substrate between a first shaped surface and a second shaped surface, the second shaped surface substantially surrounding and spaced radially outward of the first shaped surface, the first shaped surface shaping an interior surface of the first flowable substrate, and the second shaped surface shaping an exterior surface of the first flowable substrate; and
   vibrating the first shaped surface and the second shaped surface to impart sufficient energy to the first flowable substrate to harden at least one of the exterior surface and the interior surface;
   wherein a shaped, cooked product is formed.

2. The manufacturing process as recited in claim 1, comprising:
   placing a second flowable substrate in contact with a third shaped surface, the third shaped surface generally surrounded by and spaced radially inward of the first shaped surface; and vibrating the third shaped surface.

3. The manufacturing process as recited in claim 2, wherein the second flowable substrate is different than the first flowable substrate.

4. The manufacturing process as recited in claim 1, comprising:
   placing a second flowable substrate in contact with a third shaped surface, wherein the third shaped surface generally surrounds and is spaced radially outward of the second shaped surface.

5. The manufacturing process as recited in claim 4, comprising:
   vibrating the third shaped surface.

6. The manufacturing process as recited in claim 1, wherein the energy imparted to the first flowable substrate comprises ultrasonic energy.

7. The manufacturing process as recited in claim 1, wherein the first shaped surface and the second shaped surface are curvilinear.

8. A process for manufacturing a shaped product, comprising:
   placing a first flowable substrate into contact with a first shaped surface, the first shaped surface imparting a shape to an interior surface of the first flowable substrate;
   placing the first flowable substrate into contact with a second shaped surface substantially surrounding and radially outward of the first shaped surface, the second shaped surface imparting a shape to an exterior surface of the first flowable substrate; and
   vibrating the first shaped surface and the second shaped surface to transfer sufficient energy to the first flowable substrate such that the interior surface and the exterior surface retain their respective shapes when removed from contact with the first shaped surface and the second shaped surface, respectively.

9. The manufacturing process as recited in claim 8, wherein vibrating comprises transferring sufficient energy to the first flowable substrate such that one of the interior and exterior surfaces is harder than the other one of the interior and exterior surfaces.

10. The manufacturing process as recited in claim 8, comprising:
    placing a second flowable substrate in contact with a third shaped surface, wherein the third shaped surface is generally surrounded by and radially inward of the first shaped surface.

11. The manufacturing process as recited in claim 10, wherein the second flowable substrate is different than the first flowable substrate.

12. The manufacturing process as recited in claim 8, comprising:
    placing a second flowable substrate in contact with a third shaped surface, wherein the third shaped surface generally surrounds and is radially outward of the second shaped surface.

13. The manufacturing process as recited in claim 8, wherein the energy transferred to the first flowable substrate comprises ultrasonic energy.

14. A manufacturing process for making a shaped, cooked product, comprising:
- feeding a first flowable substrate through a shaping chamber, the shaping chamber defined by a first surface and a second surface, wherein the second surface substantially surrounds and is spaced radially outward of the first surface, wherein the first surface shapes an interior surface of the first flowable substrate, and wherein the second surface shapes an exterior surface of the first flowable substrate; and
- while passing the first flowable substrate through the shaping chamber, vibrating the first shaped surface and the second shaped surface to impart sufficient energy to the first flowable substrate such that the interior surface and the exterior surface retain their respective shapes after exiting the shaping chamber;
- wherein a shaped, cooked product is formed.

15. The manufacturing process as recited in claim 14, wherein, after vibrating, one of the interior surface and the exterior surface of the flowable substrate is harder than the other one of the interior and exterior surfaces.

16. The manufacturing process as recited in claim 14, comprising:
- feeding a second flowable substrate through a second chamber, the second chamber defined by a third surface that is surrounded by and spaced radially inward of the first shaping surface.

17. The manufacturing process as recited in claim 16, comprising:
- vibrating the third surface.

18. The manufacturing process as recited in claim 16, wherein the second flowable substrate is different than the first flowable substrate.

19. The manufacturing process as recited in claim 14, wherein the energy imparted to the first flowable substrate comprises ultrasonic energy.

20. A manufacturing process for making a shaped, cooked product from a flowable substrate, comprising:
- shaping the flowable substrate by feeding the flowable substrate through a shaping fixture comprising a plurality of chambers, each of the chambers defined by a wall having a shaped surface, each of the shaped surfaces having a unique shape; and
- vibrating each of the shaped surfaces to impart sufficient energy to cook the flowable substrate in the respective chambers, thereby producing a plurality of uniquely shaped, cooked products.

21. The manufacturing process as recited in claim 20, comprising:
- cutting the plurality of uniquely shaped, cooked products to form a mixture of uniquely shaped chunks.

22. The manufacturing process as recited in claim 21, wherein the plurality of uniquely shaped, cooked products are cut to form the mixture of uniquely shaped chunks while exiting the plurality of chambers.

23. The manufacturing process as recited in claim 20, wherein the flowable substrate is continuously fed through the plurality of chambers.

24. The manufacturing process as recited in claim 20, wherein energy imparted to the flowable substrate in the plurality of chambers comprises ultrasonic energy.

25. A manufacturing process for making a shaped, cooked product, comprising:
- shaping a flowable substrate by feeding the flowable substrate through a shaping chamber, the shaping chamber having a first shaped surface to impart a first shape to a first portion of the flowable substrate and a second shaped surface to impart a second shape to a second portion of the flowable substrate; and
- vibrating the first shaped surface and the second shaped surface to impart sufficient energy to the flowable substrate such that the first portion and the second portion of the flowable substrate retain their respective shapes after exiting the shaping chamber;
- wherein a shaped, cooked product is formed.

26. The manufacturing process as recited in claim 25, wherein the second shaped surface substantially surrounds and is spaced radially outward of the first shaped surface.

27. The manufacturing process as recited in claim 26, wherein the flowable substrate is fed only into the second shaped surface.

28. The manufacturing process as recited in claim 25, wherein the first shape is different than the second shape.

29. The manufacturing process as recited in claim 25, wherein vibrating the first and second shaped surfaces is performed while continuously feeding the flowable substrate through the shaping chamber.

30. The manufacturing process as recited in claim 25, wherein the energy imparted to the flowable substrate is ultrasonic energy.

31. The manufacturing process as recited in claim 25, wherein the first portion of the flowable substrate comprises a first type of flowable substrate, and wherein the second portion of the flowable substrate comprises a second type of flowable substrate different than the first type of flowable substrate.

32. A manufacturing process for making a cooked, shaped product from a flowable substrate, comprising:
- feeding a flowable substrate through a shaping fixture at a flow rate, wherein the shaping fixture comprises at least one chamber defined by a wall having a shaped surface, and wherein a sufficient volume of the flowable substrate is introduced into the chamber such that the flowable substrate contacts substantially all of the shaped surface;
- vibrating the shaped surface to impart cooking energy to the volume of the flowable substrate; and
- controlling the flow rate of the flowable substrate through the shaping fixture such that sufficient cooking energy can be imparted to thoroughly cook the entire volume of the flowable substrate.

33. The manufacturing process as recited in claim 32, wherein the flowable substrate has a flow direction through the chamber, and wherein controlling the flow rate of the flowable substrate comprises applying a back pressure on the flowable substrate directed opposite from the flow direction.

34. The manufacturing process as recited in claim 33, wherein applying the back pressure comprises providing the chamber such that the chamber extends between first and second open ends, wherein the flowable substrate enters the chamber through the first open end and exits the chamber through the second open end, and wherein at least a portion of the chamber between the first and second open ends is tapered.

35. The manufacturing process as recited in claim 32, wherein the cooking energy is ultrasonic energy.

* * * * *